(12) United States Patent
Suzuki

(10) Patent No.: US 6,854,567 B2
(45) Date of Patent: Feb. 15, 2005

(54) CASTER LOCK INDICATOR

(75) Inventor: Eifu Suzuki, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 56 days.

(21) Appl. No.: 10/337,890

(22) Filed: Jan. 8, 2003

(65) Prior Publication Data

US 2003/0132065 A1 Jul. 17, 2003

(51) Int. Cl.$^7$ .............................................. B60B 29/00
(52) U.S. Cl. ................. 188/1.12; 16/35 R; 188/1.11 R
(58) Field of Search ...................... 188/1.12, 1.11 R; 16/35 R

(56) References Cited

U.S. PATENT DOCUMENTS

| | | | | |
|---|---|---|---|---|
| 2,972,163 A | * | 2/1961 | Ross et al. ................. | 16/35 R |
| 4,035,864 A | * | 7/1977 | Schroder .................... | 16/35 R |
| 4,941,552 A | * | 7/1990 | Screen ....................... | 188/1.12 |
| 5,181,587 A | * | 1/1993 | Masatoshi .................. | 188/1.12 |
| 5,988,323 A | * | 11/1999 | Chu ........................... | 188/1.12 |

FOREIGN PATENT DOCUMENTS

| | | |
|---|---|---|
| JP | 1132401 | 5/1989 |
| JP | 7007201 | 4/1994 |
| JP | 8005843 | 1/1996 |
| JP | 11321208 | 11/1999 |

\* cited by examiner

Primary Examiner—Matthew C. Graham
(74) Attorney, Agent, or Firm—Jacobson Holman PLLC

(57) ABSTRACT

A caster lock indicator adapted to operate to indicate a locked state or an unlocked state of a caster. The caster lock indicator includes a stopper spring that operates in response to a rotary motion of a stopper lever when it is operated to unlock the caster. As the stopper lever is rotated around a lever support member, the stopper spring is turned about a stopper spring support member to lock the wheel against any swiveling motion. In the unlocked state, a lock indicator surface of a lock indicator plate can be visually recognizable through an indicator window of the stopper lever. When the caster is locked, the lock indicator plate is driven to slide so that the part for indicating the locked state of the lock indicator surface of the lock indicator plate comes to be visually recognizable through the indicator window.

5 Claims, 4 Drawing Sheets

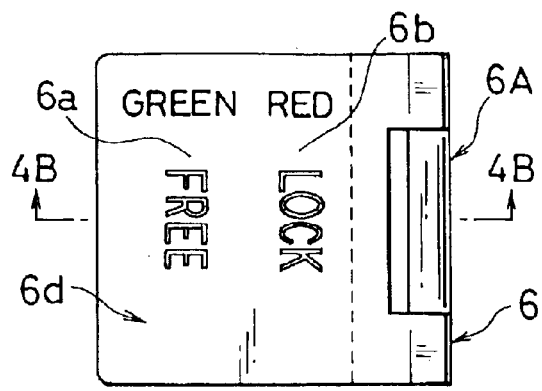
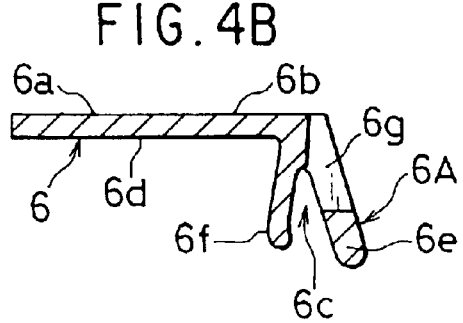
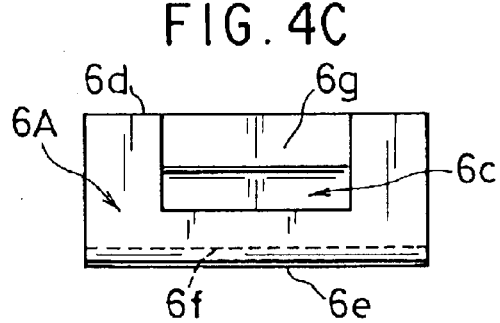
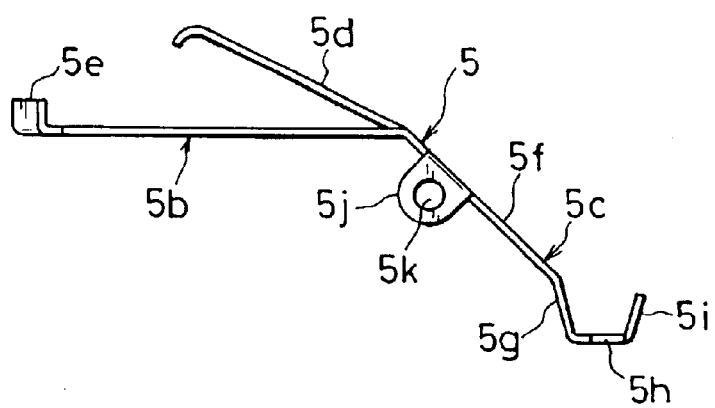
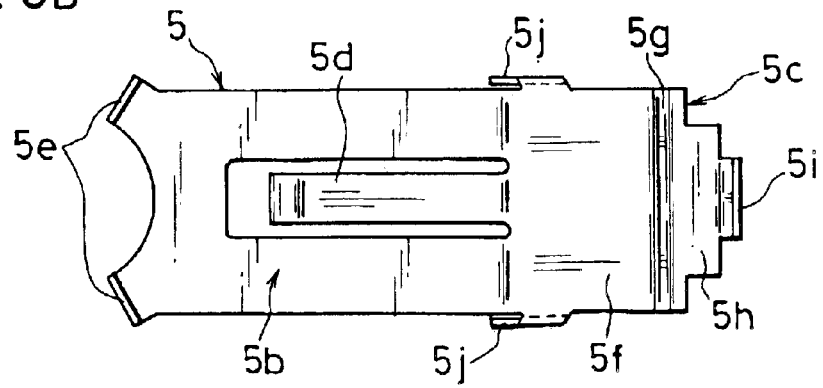

CASTER LOCK INDICATOR

BACKGROUND OF THE INVENTION

1. Field of the Invention

This invention relates to an indicator of a caster comprising a wheel and leg member and fitted to a piece of furniture or the like, which rotary leg is provided with a stopper lever that can be rotated to lock the rotary leg member against rotating and/or the wheel against swiveling and optionally with a stopper spring interlocked with such a stopper lever, said indicator being designed to indicate the locked or unlocked state of the leg member so as to allow the user to visually recognize the current locked or unlocked state of the caster.

2. Related Background Art

Indicators for allowing the user to visually recognize the locked or unlocked sate of a caster of any of various different types have been proposed to date (see, inter alia, Japanese Utility Model Publications Nos. 8-5843 and 7-7201). However, known caster lock devices have a complex structure and typically involve the use of a gear and a gear rack and/or a locking recess formed in the wheel for locking the caster.

As improvements to such caster lock devices, there have been proposed casters equipped with a lock device that comprises a stopper lever fitted to the rotary leg member of the caster and adapted to be rotated to transmit the rotary movement of the stopper lever to a stopper spring fitted to the leg and lock the leg member against rotating and optionally also the wheel against swiveling (see, inter alia, Japanese Utility Model Application Laid-Open No. 1-132401 and Japanese Patent Application Laid-Open No. 11-321208) and getting popularity.

However, no appropriate lock indicators have been proposed to date for such casters that are equipped with a lock device.

In view of the above identified circumstances, it is therefore the first object of the present invention to provide a caster lock indicator for a caster equipped with a lock device, wherein a lock indicator plate is slidably arranged in a guide space of the stopper lever of the caster in such a way that the lock indicator plate is anchored to a stopper lever sided part of the stopper spring.

Then, as the stopper lever is rotated around a lever support member, the stopper spring will be turned about the spring support member so as to lock the leg member against any rotary motion and/or the wheel against any swiveling motion by means of the movement of a fitting section side part and that of the stopper lever side part of the stopper spring.

Thus, since the lever support member and the spring support member are separated from each other, the lock indicator surface of the lock indicator plate anchored and secured to the stopper lever side part of the stopper spring will slide in said guide space while the stopper lever is being rotated so that the user can discriminate the part of the lock indicator surface indicating an unlocked state before the sliding movement and the part of the lock indictor surface indicating a locked state after the sliding movement through the indicator window of the stopper lever and hence clearly understand the current locked or unlocked state, although the lock indicator has a simple configuration.

The second object of the present invention is that the stopper spring is arranged in such a way that it can be turned about the spring support member located in an upper part of the leg lateral plates of the leg section of the caster and that an engaging section is arranged at a lever support member side of the lock indicator plate so that the free end of the stopper lever side part of the stopper spring may be releasably engaged with the engaging member. Then, as the stopper lever side part of the stopper spring is resiliently deformed by a projecting pusher section of the stopper lever, the leg member will be locked against any rotary motion when the fitting section side part of the stopper spring is anchored to the fitting section and/or the wheel is locked against any swiveling motion when the stopper lever side part of the stopper spring is pushed against the wheel. Then, the lock indicator plate will slide more reliably so that the user can visually recognize and discriminate the part of the lock indicator surface that indicates the locked state and the part of the lock indicator surface that indicates the unlocked state.

The third object of the present invention is that the fitting section side part of the stopper spring is held to the holding section formed on the support of the caster more reliably by causing a biasing spring arranged at the fitting section side part of the stopper sprint to elastically abut the leg back plate section of the leg member in order to improve the locked state of the rotary leg member.

A guide may be arranged in the guide space of the stopper lever so that the indicator plate section of the lock indicator plate may be slidably inserted between the top surface of the guide and the top wall surface of the guide space and that the lock indicator may be more reliable and free from failure.

The profile projecting pusher section of the stopper lever may be specifically defined in such a way that the stopper lever side part of the stopper spring may be smoothly and resiliently deformed when the stopper lever is pushed down to rotate. The stopper lever side part of the stopper spring may be made to include a flat panel-shaped base section, a bent link section, a linked bottom section and an upwardly bent front end section, while the lock indicator plate may be made to include an indicator plate section having a part for indicating the unlocked state and a part for indicating the locked state and a bifurcated section so that the projecting pusher section may abut the bent link section and the linked bottom section and the upwardly bent front end section may be engaged with the engaging section formed in bifurcated section of the lock indicator plate.

Additionally, if it is so arranged that the projecting pusher section elastically abuts the flat panel-shaped base section and the upwardly bent front end section retractably enter the escape hole formed in the anchor plate section, the lock indicator plate will smoothly move from the position indicating the unlocked state to the position indicating the locked state.

BRIEF SUMMARY OF THE INVENTION

In the first aspect of the invention, the above first object is achieved by providing a caster lock indicator to be used for a caster comprising a wheel fitted to a leg member rigidly or rotatably secured to a fitting section, said caster having a stopper lever rotatably fitted to said leg member by way of a lever support member and adapted to be rotated in order to turn a stopper spring also fitted to said leg member by way of a spring support member, thereby causing the fitting section side part of the stopper spring to be held relative to said fitting section so as to lock the leg member against any rotary motion and/or causing the stopper lever side part of the stopper spring to abut the wheel so as to lock the wheel against any swiveling motion, said lock indicator having a lock indicator plate, characterized in that the part for indicating the unlocked state of the lock indicator surface of the lock indicator plate slidably contained in a guide space of the stopper lever is visually recognizable through the indicator window when the stopper lever is in the unlocked state, whereas the part for indicating the locked state of the lock indicator surface of the lock indicator plate located adjacent to the part for indicating the unlocked state is visually recognizable through the indicator window instead of said part for indicating the unlocked state when the stopper lever is rotated to lock the leg member and/or the wheel as the lock indicator plate anchored to a stopper lever side part of the stopper spring supported by the spring support member arranged at a position different from said lever support member is made to returnably slide in said guide space relative to the stopper lever.

In the second aspect of the invention, the above second object is achieved by providing a caster lock indicator to be used for a caster comprising a wheel fitted to a leg member rigidly or rotatably secured to a fitting section, characterized in that said stopper spring is fitted to an upper part of the leg lateral wall sections of said leg member by way of a spring support member so as to be turned freely, said stopper spring having a stopper lever side part extending at the side opposite to the fitting section side thereof, a stopper lever is also rotatably fitted to the leg member by way of a lever support member arranged at a position more remote from the fitting section than the spring support member, said stopper lever having an indicator window, a projecting pusher section formed near the lever support member and a guide space containing a lock indicator plate so as to make the latter slidable, the free end side of said stopper lever side part being releasably engaged with an engaging section formed at the lever support member side of the lock indicator plate, so that the part for indicating the unlocked state of the lock indicator surface of the lock indicator plate slidably and releasably anchored to the stopper lever is visually recognizable through the indicator window when the caster is in the unlocked state, whereas the part for indicating the locked state of the lock indicator surface of the lock indicator plate located adjacent to the part for indicating the unlocked state is visually recognizable through the indicator window instead of said part for indicating the unlocked state when the stopper lever is operated from the locked state of the caster in order to rotate it around the lever support member, thereby causing said projecting pusher section to push and resiliently deform said stopper lever side part so as to lock the leg member against any rotary motion by making the fitting section side of the stopper ring to be engaged with the fitting section and/or lock the wheel against any swiveling motion by making the stopper lever side part of the stopper spring to be pushed against the wheel.

In the third aspect of the invention, the above third object is achieved by providing a caster lock indicator to be used for a caster comprising a wheel fitted to a leg member rigidly or rotatably secured to a support of a fitting section, characterized in that a stopper spring is fitted to an upper part of the leg lateral wall sections of said leg member by way of a spring support member so as to be turned freely, said spring support member being running in parallel with the axle of the wheel and supporting said stopper spring substantially at the center thereof, said stopper spring having a fitting section side part extending at the support side thereof and having a biasing spring to be resiliently abutted against the leg member so as to operate as stopper for preventing the leg member from rotating and a stopper lever side part extending at the side opposite to the fitting section side thereof so as to operate as stopper for preventing the wheel from swiveling, a rotatable stopper lever being fitted to said leg member by way of a stopper lever support member arranged in parallel with the stopper spring support member at a position more remote from the fitting section than the stopper spring support member, said stopper lever having an indicator window, a projecting pusher section formed near said stopper lever support member and a guide space containing a lock indicator plate so as to make the latter slidable, the free end side of said stopper lever side part being releasably engaged with an engaging section formed at the lever support member side of the lock indicator plate, so that the part for indicating the unlocked state of the lock indicator surface of the lock indicator plate slidably and releasably anchored to the stopper lever is visually recognizable through the indicator window when the caster is in the unlocked state, whereas the part for indicating the locked state of the lock indicator surface of the lock indicator plate located adjacent to the part for indicating the unlocked state is visually recognizable through the indicator window instead of said part for indicating the unlocked state when the stopper lever is operated from the locked state of the caster in order to rotate it around the lever support member, thereby causing said projecting pusher section to push and resiliently deform said stopper lever side part so as to lock the leg member against any rotary motion by making the fitting section side of the stopper ring to be engaged with the fitting section and also lock the wheel against any swiveling motion by making the stopper lever side part of the stopper spring to be pushed against the wheel.

A projecting guide may be arranged in the guide space of the stopper lever so that the indicator plate section of the lock indicator plate is slidably pinched between the top surface of the guide and the top wall surface of the guide space where the indicator window is arranged.

The projecting pusher section of the stopper lever may be in the form of a cam carrying the lever support member.

It may be so arranged that the stopper lever side part of the stopper spring has a flat panel-shaped base section extending from the spring support member, a bent link section bent and extended downward from the base section, a linked bottom section bent and extended outward from the link section and an upwardly bent front end section bent and extended upward from the bottom section, whereas the lock indicator plate includes an indicator plate section having the part of the lock indicator surface for indicating the unlocked state and the part of the lock indicator surface for indicating the locked state and a bifurcated section in such a way that the projecting pusher section of the stopper lever abuts the bent link section and the linked bottom section arranged at the stopper lever side part and the upwardly bent front end section is engaged with the engaging section formed in the bifurcated section of the lock indicator plate in the unlocked state, whereas the projecting pusher section abuts the flat panel-shaped section of the stopper lever side part and the upwardly bent front end section can retractably enter the escape hole cut through the lock indicator plate between the engaging section and the base side of the anchor plate section.

BRIEF DESCRIPTION OF THE DRAWINGS

FIG. 1B is a schematic partial lateral view of a caster provided with a lock indicator according to the invention, illustrating an alternative stopper spring support mechanism.

FIG. 4A is a schematic plan view of the lock indicator plate of FIG. 1.

FIG. 4B is a schematic cross sectional view of the lock indicator plate of FIG. 1 taken along line B-B.

FIG. 4C is a schematic lateral view of the lock indicator plate of FIG. 1 as viewed from the right side of FIG. 4A.

FIG. 5A is a schematic lateral view of the stopper spring of FIG. 1.

FIG. 5B is a schematic plan view of the stopper spring of FIG. 1.

DETAILED DESCRIPTION OF THE INVENTION

Figure 1:
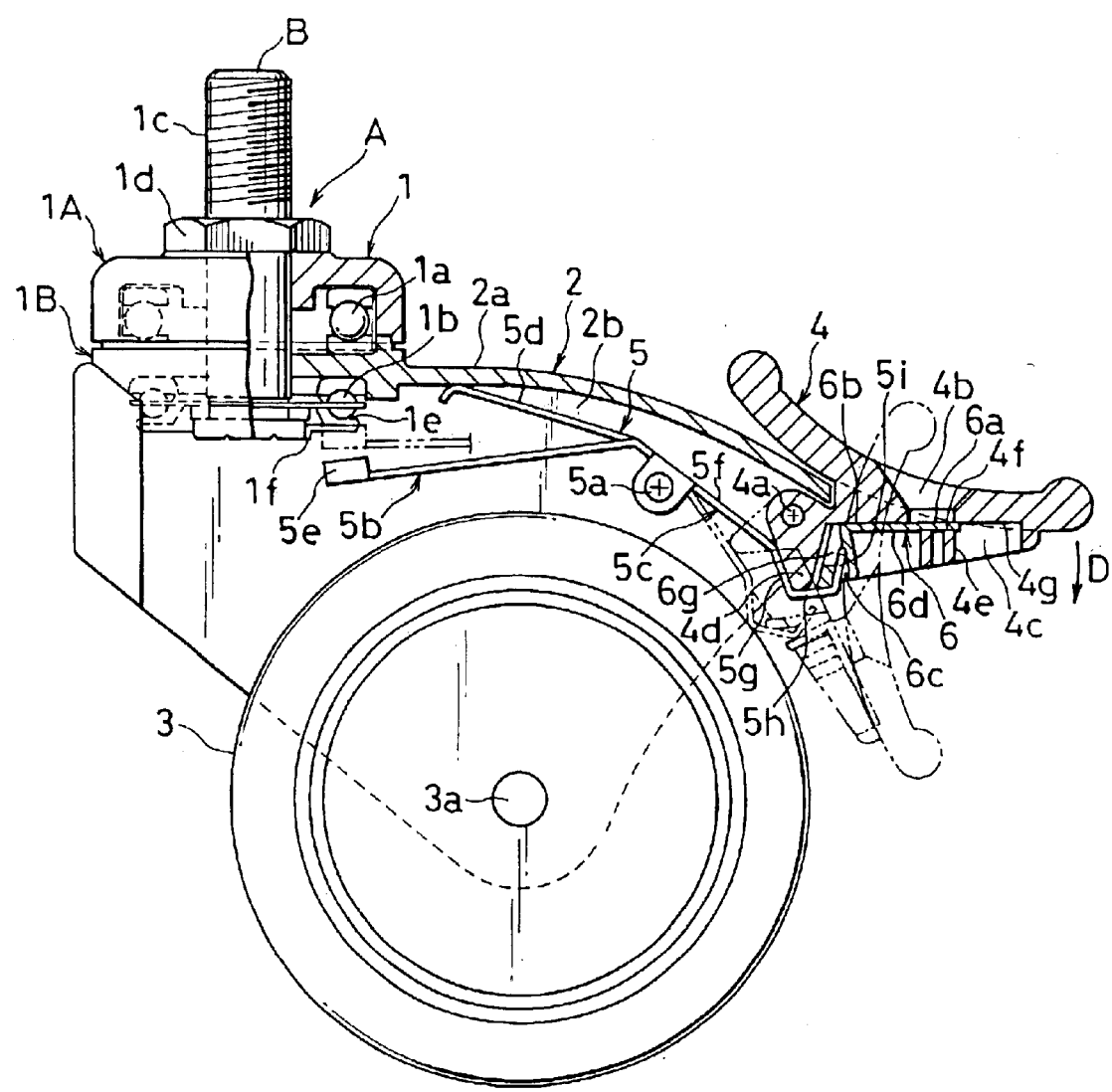
FIG. 1 is a partly cut out schematic partial lateral view of a caster provided with a lock indicator according to the invention, illustrating the unlocked state and the locked state of the caster.

Now, an embodiment of the present invention will be described in detail by referring the accompanying drawings. Referring particularly to FIG. 1, caster A has a known configuration as described below. It comprises a fitting section B to be fitted to a chair, a table or the like. The fitting section B includes a support 1 realized by unifying an upper ball bearing section 1A containing upper balls 1a and a lower ball bearing section 1B containing lower balls 1b by means of a fitting bolt 1c and a nut 1d, although there are types that do not have such a support 1. The leg back plate section 2a of an inverted U-shaped leg member 2 is pinched between the upper ball bearing section 1A and the lower ball bearing section 1B in such a way that it can be rotated horizontally. In FIG. 1, reference symbol 2b denotes a pair of leg lateral plate sections bent and extended downward respectively from the front end and the rear end of the leg back plate section 2a. Wheel 3 is rotatably supported by horizontal axle 3a between the pair of leg lateral plate sections 2b.

Figure 2A:
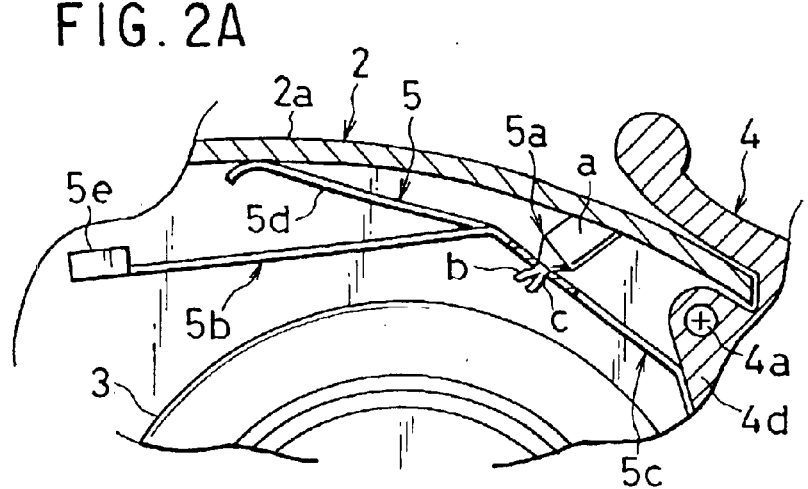
FIG. 2A is a partly cut out schematic partial lateral view of a caster provided with a lock indicator according to the invention, illustrating an alternative spring support member.

In the illustrated instance of leg member 2, a stopper spring 5 is supported by the leg lateral plate sections 2b of the leg member 2 by way of a spring support member 5a in such a way that it is turned about the spring support member 5a as the stopper lever 4, which is supported by a horizontal lever support member 4a fitted to the leg lateral wall plate sections 2b, is pushed down and turned in the direction indicated by arrow D by means of a finger nail tip or the like from the unlocked position. In FIG. 1, the spring lever 4 is shaded in the unlocked position. FIG. 2A illustrates an alternative spring support means for supporting the stopper spring 5 at the leg member 2 so as to allow it to turn. Referring to FIG. 2A, the spring support member 5a projects downward from the leg back plate section 2a of the leg member 2 and a diametrically reducible anti-release section 3b is linked to the base section a of the spring support member 5a by way of a neck section. Thus, the stopper spring 5 comes to be supported so as to be able to turn as the engaging aperture c of the stopper spring 5 is brought into unreleasable engagement with the anti-release section 3b. Although not shown, a pair of limiting plates is preferably provided and made to project downward from the leg back plate section 2a of the leg member 2 so as to allow the stopper spring 5 to be vertically movable and turn smoothly between the pair of limiting plates. With such an arrangement, the fitting section side part 5b of the stopper spring 5 comes to be held in groove 1e of the lower ball bearing section 1B of the support 1 of the fitting section B in the illustrated embodiment. Under this condition, the leg member 2 is locked and unrotatable and/or the wheel 3 becomes unrotatable as the stopper lever side part 5c of the stopper spring 5 is pushed against the wheel 3.

Figure 2B:
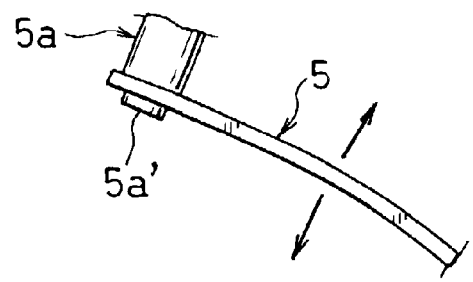
FIG. 2B is a schematic partial lateral view of a caster provided with a lock indicator according to the invention, illustrating another alternative stopper spring support mechanism.

Instead of using a spring support means for supporting the stopper spring 5 at the leg member 2 so as to allow it to turn, the stopper spring 5 may be rigidly secured to the spring support member 5a by means of an anti-release securing edge section 5a' as shown in FIG. 2B.

With this arrangement, the stopper spring 5 does not rotate unlike the arrangement of FIG. 2A but swings vertically in the directions indicated by arrows in FIG. 2B due to the elasticity of the stopper spring 5 itself. Then, the operation of the stopper spring 5 is equivalent to that of its counterpart of FIG. 2A.

In the first aspect of the invention, when the stopper lever 4 of the caster A having the above described configuration is in the unlocked position, where it is shaded in FIG. 1, the part 6a of the lock indicator surface, which indicates the unlocked state, of the lock indicator plate 6 that is laterally slidably contained in the guide space 4c of the stopper lever 4 can be visually observed and recognized by the user through the indicator window 4b arranged at the stopper lever 4. In other words, the part 6b of the lock indicator surface, which indicates the locked state and is located adjacent to the part 6a of the lock indicator surface, which indicates the unlocked state, is hidden by the stopper lever 4 and hence cannot be visually observed for recognition when the stopper lever 4 is in the unlocked position. Additionally, as will be described in greater detail hereinafter, the part 6a of the lock indicator surface, which indicates the unlocked state, may carry word "FREE" or be painted red, whereas the part 6b of the lock indicator surface, which indicates the locked state, may carry word "LOCK" or be painted green, whichever appropriate. Alternatively, the part 6b of the lock indicator surface, which indicates the locked state, may carry a word or be painted to a color, whereas the part 6a of the lock indicator surface, which indicates the unlocked state may be left blank.

In the first aspect of the invention, said stopper lever 4 is pushed downward and turned in the direction of arrow D to lock the leg member 2 or the wheel 3 so that it may not be rotated as described above by referring to FIG. 1. Since the lock indicator plate 6 is anchored to the stopper lever side part 5c, the relative positional relationship of the stopper lever 4 and the lock indicator plate 6 contained in the stopper lever 4 changes as a result of sliding motion in a manner as described below.

As will be understood by comparing the stopper lever 4 shaded in the unlocked position and the stopper lever 4 drawn by a phantom line in the locked position in FIG. 1, the stopper lever 4 rotates about the lever support member 4a, whereas the stopper spring 5 is turned about the spring support member 5a that is independent from the lever support member 4a.

Thus, in the case of the arrangement of FIG. 1, the stopper lever 4 rotates with a relatively short radius, while the lock indicator plate 6 rotates with a relatively long radius so that consequently the lock indicator plate 6 slides rightward in FIG. 1 within the guide space 4c of the stopper lever 4 and hence the part 6a of the lock indicator surface that is visually observed through the indicator window 4b to indicate the unlocked state is replaced by the part 6b of the lock indicator surface that indicates the locked state.

The positional relationship of the lever support member 4a and the spring support member 5a may be laterally inverted from the illustrated arrangement in such a way that the part 6b of the lock indicator surface is exposed when the lock indicator plate 6 is moved leftward in FIG. 1. Alternatively, the distance separating the lever support member 4a and the spring support member 5a may be appropriately changed to change the distance by which the lock indicator plate 6 slides. In any case, the object of indicating the locked or unlocked state of the caster can be achieved by a relatively simple arrangement.

In the second aspect of the invention, specific elements are added to the basic configuration as described above in terms of the first aspect of the invention for the purpose of smoother operation.

More specifically, in the second aspect of the invention, the stopper spring 5 is rotatably supported by the spring support member 5a at an upper position of the leg lateral plate sections 2b of the leg member 2 of the caster A.

The stopper lever 4 is provided at a position near the indicator window 4b and the lever support member 4a with a projecting pusher section 4d and the free end 5c of the stopper spring 5 located close to the stopper lever 4 is releasably engaged with engaging section 6c of the lock indicator plate 6 arranged near the lever support member 4a.

With these additionally elements, as the stopper lever 4 is rotated around the lever support member 4a, the projecting pusher section 4d resiliently deforms the free end 5c of the stopper spring 5 located close to the stopper lever 4 to lock the leg member or the free end 5c of the stopper spring 5 located close to the stopper lever 4 is forced to abut the wheel 3 to reliably and smoothly hold the wheel in a locked state. Then, the part 6a of the lock indicator surface that is visually observed through the indicator window 4b to indicate the unlocked state is replaced by the part 6b of the lock indicator surface that indicates the locked state.

In the third aspect of the invention, again, specifically and elaborately defined elements are employed to the basic configuration as described above in terms of the first aspect of the invention for the purpose of smoother operation.

As described above, the caster A comprises a leg member 2 rotatably fitted to the support 1 of the fitting section B and a wheel 3 rotatably fitted to the horizontal axle 3a. The stopper spring 5 is supported substantially at the center thereof by a spring support member 5a running in parallel with the axle 3a and located at an upper position of the leg lateral plate sections 2b of the leg member 2.

A leg anti-rotation stopper part 5b is formed on the stopper spring 5 at a position near the support 1. The leg anti-rotation stopper part 5b is provided with a biasing spring 5d that elastically abuts the leg back plate section 2a of the leg member 2. On the other hand, a wheel ant-rotation stopper part 5c is formed on the stopper spring 5 at the side opposite to the support 1.

The stopper lever 4 is supported by the lever support member 4a that is arranged at the leg member 2 and separated from the spring support member 5a toward the side opposite to the fitting section B in such a way that it can be operated to rotate.

Figure 3A:
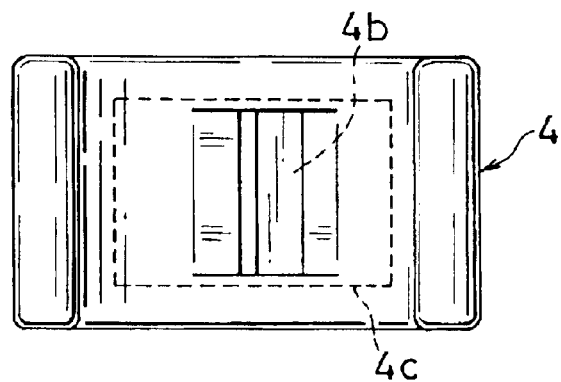
FIG. 3A is a schematic plan view of the stopper lever of FIG. 1.
Figure 3C:
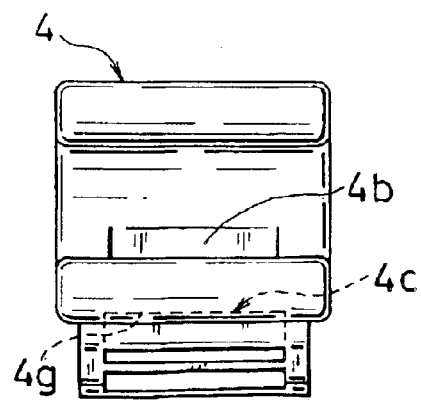
FIG. 3C is a schematic front view of the stopper lever of FIG. 1.
Figure 3B:
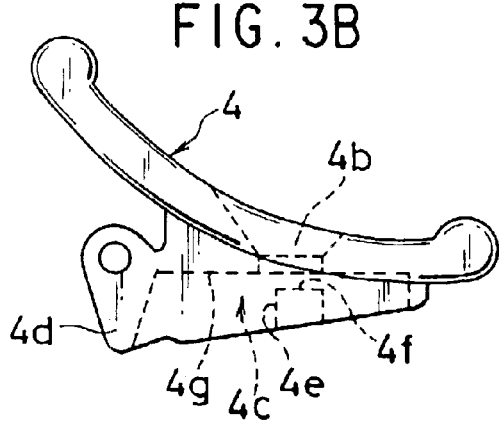
FIG. 3B is a schematic lateral view of the stopper lever of FIG. 1.

As shown in FIGS. 3A through 3C, the stopper lever 4 is provided with an indicator window 4b that is arranged at the center thereof and also with a projecting pusher section 4d that is arranged near the lever support member 4a. As described above, the stopper lever 4 is additionally provided with a guide space 4c in which the lock indicator plate 6 can slide. The guide space 4c is in communication with the indicator window 4b.

The lock indicator plate 6 is provided at the side thereof close to the lever support member 4a with an engaging section 6c which is releasably engaged with the free end 5c of the stopper spring 5 located close to the stopper lever 4.

With the above described arrangement, the part 6a of the lock indicator surface of the lock indicator plate 6 that indicates the unlocked state can be visually observed through the indicator window 4b when the caster is in the unlocked state. As the stopper lever 4 is operated to push it downward and rotate around the lever support member 4a from the unlocked state in the direction of arrow D, the projecting pusher section 4d is rotated to resiliently deform the stopper lever side part 5c of the stopper spring 5.

As a result, the anchor projection 5e of the fitting section side part 5b of the stopper spring 5 can be held by the holding section 1f of the groove 1e of the support 1 to lock the leg member 2 and make it unrotatable.

Simultaneously with the rotary motion of the stopper lever 4 for locking the leg member 2, the stopper lever side part 5c of the stopper spring 5 is pushed against the wheel 3 to lock the wheel. Then, the wheel 3 is held in the locked state by the resilient force of the stopper spring 5. As a result, the lock indicator plate 6 releasably engaged with the stopper lever side part 5c of the stopper spring 5 slides outward in the guide space 4c of the stopper lever 4 as described above so that the part 6a of the lock indicator surface of the lock indicator plate 6 that has been visually observed through the indicator window 4b to indicate the unlocked state is replaced by the adjacent part 6b of the lock indicator surface indicating the locked state.

In the fourth aspect of the invention, the lock indicator plate 6 is made to slide more smoothly in the guide space 4c of the stopper lever 4 and, at the same time, prevented from inadvertently slipping away from the guide space 4c to enhance the reliability of the indicator. As seen from FIGS. 4A through 4C and more clearly from FIGS. 6A through 6C, a guide 4e is arranged to project in the guide space 4c in such a way that the indicator plate section 6d of the lock indicator plate 6 can slide between the top surface 4f of the guide 4e and the top wall surface 4g of the guide space 4c where the indicator window 4b is formed.

Figure 6A:
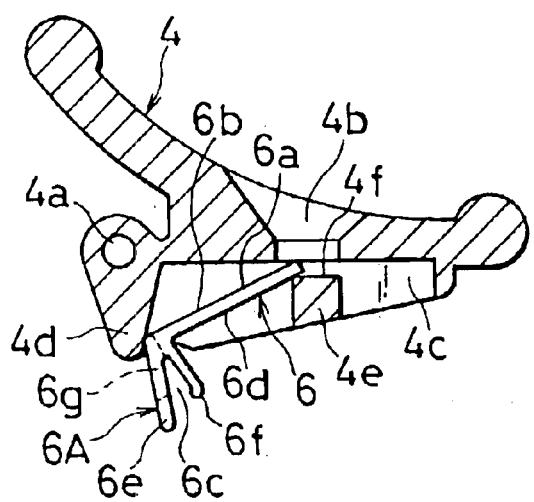
FIG. 6A is a schematic longitudinal cross sectional front view of the stopper lever, illustrating an initial stage of loading the lock indicator plate.
Figure 6B:
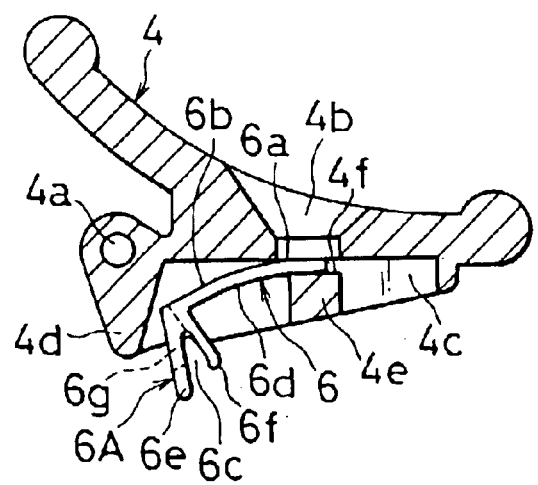
FIG. 6B is a schematic longitudinal cross sectional front view of the stopper lever, illustrating a stage where the lock indicator plate is loaded by half.
Figure 6C:
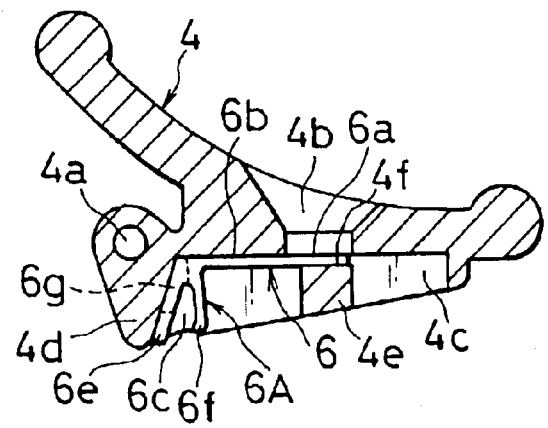
FIG. 6C is a schematic longitudinal cross sectional front view of the stopper lever, illustrating the stage of completion of the operation of loading the lock indicator plate.

The lock indicator plate 6 is placed in the guide space 4c of the stopper lever 4 in a manner as shown in FIGS. 6A through 6C. Firstly, the indicator plate section 6d is inserted between the indicator window 4b and the top surface 4f of the guide 4e from the side of the projecting pusher section 4d of the guide space 4c as shown in FIG. 6A and moved to the side of the projecting pusher section 4d in the guide space 4c as shown in FIG. 6C, while warping the indicator plate section 6d as shown in FIG. 6B, until the part 6a of the indicator plate section 6d that indicates the unlocked state is aligned with the indicator window 4d.

The projecting pusher section 4d of the stopper lever 4 may be realized in the form of a cam carrying the lever support member 4a. With this arrangement, force can be smoothly transmitted to the stopper lever side part 5c of the stopper spring 5 to improve the reliability of operation of a lock indicator according to the invention in the second and third aspects of the invention.

As for the stopper spring 5, the configuration of the stopper lever side part 5c and that of the lock indicator plate 6 may be more specifically defined to make their respectively operations more smooth and reliable.

The stopper lever side part 5c of the stopper spring 5 may be made to comprise a flat panel-shaped base section 5f extending from the spring support member 5a, a bent link section 5g bent and extended downward from the base section 5f, a linked bottom section 5h bent and extended outward from the link section 5g and an upwardly bent front end section 5i bent and extended upward from the bottom section 5h. Thus, the longitudinal cross section of the stopper lever side part 5c shows a profile similar to that of a dipper.

Referring to FIGS. 5A and 5B, reference symbol 5j denotes a bearing washer having a shaft hole 5k, through which the lever support member 4a runs. The above described biasing spring 5d is produced by cutting the fitting section side part 5b and bending the cut area upward.

As shown in FIGS. 4A through 4C, the lock indicator plate 6 comprises an indicator plate section 6d having the part 6a of the lock indicator surface for indicating the unlocked state and the part 6b of the lock indicator surface for indicating the locked state and a bifurcated section 6A, where the above described engaging section 6c is formed between anchor plate section 6e projecting downward from the side of the projecting pusher section 4d and pusher plate section 6f, which are separated from each other. In FIGS. 4A through 4C, reference symbol 6g denotes an escape hole cut through the lock indicator plate 6 between the engaging section 6c and the anchor plate section 6e.

In the fourth aspect of the invention, the projecting pusher section 4d of the stopper lever 4 abuts the bent link section 5g and the linked bottom section 5h of the stopper lever side part 5c of the stopper spring 5 and the upwardly bent front end section 5i is engaged with the engaging section 6c of the lock indicator plate 6 in the unlocked state.

In the locked state, on the other hand, the projecting pusher section 4d resiliently abuts the flat panel-shaped base section 5f of the stopper lever side part 5c of the stopper spring 5 and the upwardly bent front end section 5i can retractably enter the escape hole 6g cut through the lock indicator plate 6 between the engaging section 6c and the base side of the anchor plate section 6e so that the upwardly bent front end section 5i can turn into the escape hole 6g as the stopper lever 4 is pushed down and rotated. As a result, the upwardly bent front end section 5i of the stopper lever side part 5c of the stopper spring 5 prevents the lock indicator plate 6 from rotating while stopper lever side part 5c being held in engagement with the lock indicator plate 6 to ensure the reliability of the locking operation.

Advantages of the Invention

As described above in detail, a caster lock indicator in the first aspect of the invention has a simple configuration and comprises a stopper lever support section and a stopper spring support member arranged on the leg member of the caster and separated from each other, wherein the stopper spring is driven to turn so as to lock the leg member and/or the wheel of the caster against rotating as the stopper lever is rotated to make the stopper spring operational and the stopper lever side part of the stopper spring and the lock indicator plate contained in the guide space of the stopper lever are brought into mutual engagement. With this arrangement, the lock indicator plate can be driven to slide smoothly and reliably so that the user can visually observe either the part of the lock indicator surface indicating the unlocked state or the part of the lock indicator surface indicating the locked state and reliably recognize the current status of the lock.

In the second aspect of the invention, the spring support member of the stopper spring is arranged at the leg lateral plate sections to improve the robustness and the stability of the locking mechanism and a projecting pusher section is arranged near the lever support member while an engaging section is arranged near the lever support member so that the stopper lever side part of the stopper spring may be releasably engaged therewith. With this arrangement, the lock indicator plate can slide even more smoothly.

In the third aspect of the invention, the configurations of the stopper lever, the stopper spring and the lock indicator plate are more specifically defined so as to improve the advantages of the present invention including the reliability.

In the fourth aspect of the invention, an appropriate guide is arranged internal the guide space of the stopper lever to allow the lock indicator plate to be mounted with ease without any risk of coming out and slide more smoothly. Thus, the advantages of the present invention including the reliability are further improved.

When a projecting pusher section is arranged in the form of a cam carrying a lever support member on the stopper spring, the operation of rotating the stopper lever can be conducted highly smoothly and the objects in the second and third aspect of the invention can be achieved reliably.

When the stopper lever side part of the stopper spring is appropriately bent and the lock indicator plate is made to have a bifurcated section including a specifically designed engaging section and an escape hole and an indicator plate section, the stopper lever can be operated highly smoothly to lock the caster.

What is claimed is:

1. A caster lock indicator to be used for a caster comprising a wheel fitted to a leg member rigidly or rotatably secured to a fitting section, said caster having a stopper lever, including an indicator window, rotatably fitted to said leg member by way of a lever support member and adapted to be rotated in order to turn a stopper spring also fitted to said leg member by way of a spring support member, said stopper spring having a fitting section side part and a stopper lever side part, whereby rotation of said stopper lever causes the fitting section side part of the stopper spring to be held relative to said fitting section so as to lock the leg member against any rotary motion and/or causing the stopper lever side part of the stopper spring to abut the wheel so as to lock the wheel against any swiveling motion, said caster lock indicator further comprising a lock indicator plate, slidably contained in a guide space of said stopper lever and having a lock indicator surface including a part for indicating the unlocked state slidably contained in a guide space of the stopper lever to be visually recognizable through the indicator window when the stopper lever is in the unlocked state, and a part for indicating the locked state located adjacent to the part for indicating the unlocked state to be visually recognizable through the indicator window instead of said part for indicating the unlocked state when the stopper lever is rotated to lock the leg member and/or the wheel as the lock indicator plate anchored to said stopper lever side part of the stopper spring supported by the spring support member arranged at a position different from said lever support member is made to returnably slide in said guide space relative to the stopper lever.

2. A caster lock indicator to be used for a caster comprising a wheel fitted to a leg member rigidly or rotatably secured to a fitting section, a stopper spring fitted to an upper part of leg lateral wall sections of said leg member by way of a spring support member so as to be turned freely, said stopper spring having a stopper lever side part extending at the side opposite to the fitting section side thereof, a stopper lever rotatably fitted to the leg member by way of a lever support member arranged at a position more remote from the fitting section than the spring support member, said stopper lever having an indicator window, a projecting pusher section formed near the lever support member and a guide space containing a lock indicator plate slidable within the guide space, the free end side of said stopper lever side part being releasably engaged with an engaging section formed at the lever support member side of the lock indicator plate, wherein said lock indicator plate having a lock indicator surface including a part for indicating the unlocked state of the lock indicator surface of the lock indicator plate slidably and releasably anchored to the stopper lever is visually recognizable through the indicator window when the caster is in the unlocked state, whereas the part for indicating the locked state of the lock indicator surface of the lock indicator plate located adjacent to the part for indicating the unlocked state is visually recognizable through the indicator window instead of said part for indicating the unlocked state when the stopper lever is operated from the locked state of the caster in order to rotate it around the lever support member, thereby causing said projecting pusher section to push and resiliently deform said stopper lever side part so as to lock the leg member against any rotary motion by making the fitting section side of the stopper spring to be engaged with the fitting section and/or lock the wheel against any swiveling motion by making the stopper lever side part of the stopper spring to be pushed against the wheel.

3. A caster lock indicator according to claim 2 wherein
the stopper lever side part of the stopper spring has a flat panel-shaped base section extending from the spring support member, a bent link section bent and extended downward from the base section, a linked bottom section bent and extended outward from the link section and an upwardly bent front end section bent and extended upward from the bottom section, whereas the lock indicator plate includes an indicator plate section having the part of the lock indicator surface for indicating the unlocked state and the part of the lock indicator surface for indicating the locked state and a bifurcated section in such a way that the projecting pusher section of the stopper lever abuts the bent link section and the linked bottom section arranged at the stopper lever side part and the upwardly bent front end section is engaged with the engaging section formed in the bifurcated section of the lock indicator plate in the unlocked state, whereas the projecting pusher section abuts the flat panel-shaped section of the stopper lever side part and the upwardly bent front end section can retractably enter the escape hole cut through the lock indicator plate between the engaging section and the base side of the anchor plate section.

4. A caster lock indicator to be used for a caster comprising a wheel fitted to a leg member rigidly or rotatably secured to a support of a fitting section, a stopper spring fitted to an upper part of the leg lateral wall sections of said leg member by way of a spring support member so as to be turnable, said spring support member running in parallel with the axle of the wheel and supporting said stopper spring substantially at the center thereof, said stopper spring having a fitting section side part extending at the support side thereof and having a biasing spring to be resiliently abutted against the leg member so as to operate as stopper for preventing the leg member from rotating and a stopper lever side part extending at the side opposite to the fitting section side thereof so as to operate as stopper for preventing the wheel from swiveling, a rotatable stopper lever being fitted to said leg member by way of a stopper lever support member arranged in parallel with the stopper spring support member at a position more remote from the fitting section than the stopper spring support member, said stopper lever having an indicator window, a projecting pusher section formed near said stopper lever support member and a guide space containing a lock indicator plate so as to make the latter slidable, the free end side of said stopper lever side part being releasably engaged with an engaging section formed at the lever support member side of the lock indicator plate, so that the part for indicating the unlocked state of the lock indicator surface of the lock indicator plate slidably and releasably anchored to the stopper lever is visually recognizable through the indicator window when the caster is in the unlocked state, whereas the part for indicating the locked state of the lock indicator surface of the lock indicator plate located adjacent to the part for indicating the unlocked state is visually recognizable through the indicator window instead of said part for indicating the unlocked state when the stopper lever is operated from the locked state of the caster in order to rotate it around the lever support member, thereby causing said projecting pusher section to push and resiliently deform said stopper lever side part so as to lock the leg member against any rotary motion by making the fitting section side of the stopper spring to be engaged with the fitting section and also lock the wheel against any swiveling motion by making the stopper lever side part of the stopper spring to be pushed against the wheel.

5. A caster lock indicator for a caster assembly comprising a wheel rotatably fitted to a leg member, said leg member rigidly or rotatably secured to a fitting section, said caster lock indicator comprising a stopper spring having a fitting section end and a stopper lever end, said stopper spring connected to said leg member through a spring support member intermediate the fitting section end and stopper lever end of said stopper spring;
a stopper lever pivotally connected to said leg member at a location between said spring support member and said spring stopper lever end, said stopper lever including an indicator window and a guide space below said indicator window;
a lock indicator plate slidably positioned within said guide space and anchored to said stopper lever end of said stopper spring, said lock indicator plate including a lock indicator surface indicating locked and unlocked positions of the caster, wherein said lock indicator surface locked and unlocked positions are visible through the indicator window of said stopper lever, wherein said stopper lever engages the stopper spring adjacent the stopper lever end, such that rotation of said stopper lever against the stopper lever spring causes the lock indicator plate to slide within the guide space.

* * * * *